(12) United States Patent
Trujillo et al.

(10) Patent No.: US 11,838,150 B2
(45) Date of Patent: Dec. 5, 2023

(54) LEVERAGING A VIRTUAL ROUTER TO BRIDGE BETWEEN AN UNDERLAY AND AN OVERLAY

(71) Applicant: DISH Wireless L.L.C., Englewood, CO (US)

(72) Inventors: Andrew Trujillo, Littleton, CO (US); Ash Khamas, Goffstown, NH (US); Sundeep Goswami, Leesburg, VA (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

(21) Appl. No.: 18/101,069

(22) Filed: Jan. 24, 2023

(65) Prior Publication Data
US 2023/0336381 A1    Oct. 19, 2023

Related U.S. Application Data

(60) Provisional application No. 63/331,107, filed on Apr. 14, 2022.

(51) Int. Cl.
*H04L 12/66* (2006.01)
*H04L 12/46* (2006.01)

(52) U.S. Cl.
CPC ............ *H04L 12/66* (2013.01); *H04L 12/462* (2013.01); *H04L 12/4633* (2013.01)

(58) Field of Classification Search
None
See application file for complete search history.

(56) References Cited

U.S. PATENT DOCUMENTS

| 2018/0248787 A1* | 8/2018 | Rajagopal ............ H04W 72/543 |
| 2021/0045193 A1 | 2/2021 | Mishra et al. |
| 2021/0385149 A1 | 12/2021 | Suryanarayana et al. |
| 2022/0247812 A1* | 8/2022 | Mehta .................. H04L 67/1031 |
| 2023/0198676 A1* | 6/2023 | K N ...................... H04L 1/1809 370/236 |

OTHER PUBLICATIONS

"3rd Generation Partnership Project; Technical Specification Group Radio Access Network; NG-RAN; Architecture Description (Release 16)," 3GPP TS 38.401 V16.8.0, Dec. 2021, 79 pages.

* cited by examiner

*Primary Examiner* — Angela Nguyen
(74) *Attorney, Agent, or Firm* — SEED INTELLECTUAL PROPERTY LAW GROUP LLP

(57) ABSTRACT

Embodiments are directed towards systems and methods for bridging data traffic between an underlay network and an overlay network within a wireless telecommunication network, such as a wireless 5G network. One such method including: providing access to an overlay network that includes virtual routers, wherein the overlay network is built above the underlay network, the underlay network including physical infrastructure that delivers packets; providing a UPFv that acts as an anchor for telephony voice functions; establishing routing protocols to transmit from the UPFv to one or more of the virtual routers; configuring one or more of the virtual routers to bridge an outgoing communication from the UPFv to a public cloud provider; instructing the virtual router to send the outgoing communication through the public cloud provider to the underlay network; and instructing the virtual router to receive an incoming communication from the underlay network through the public cloud provider to the UPFv.

18 Claims, 8 Drawing Sheets

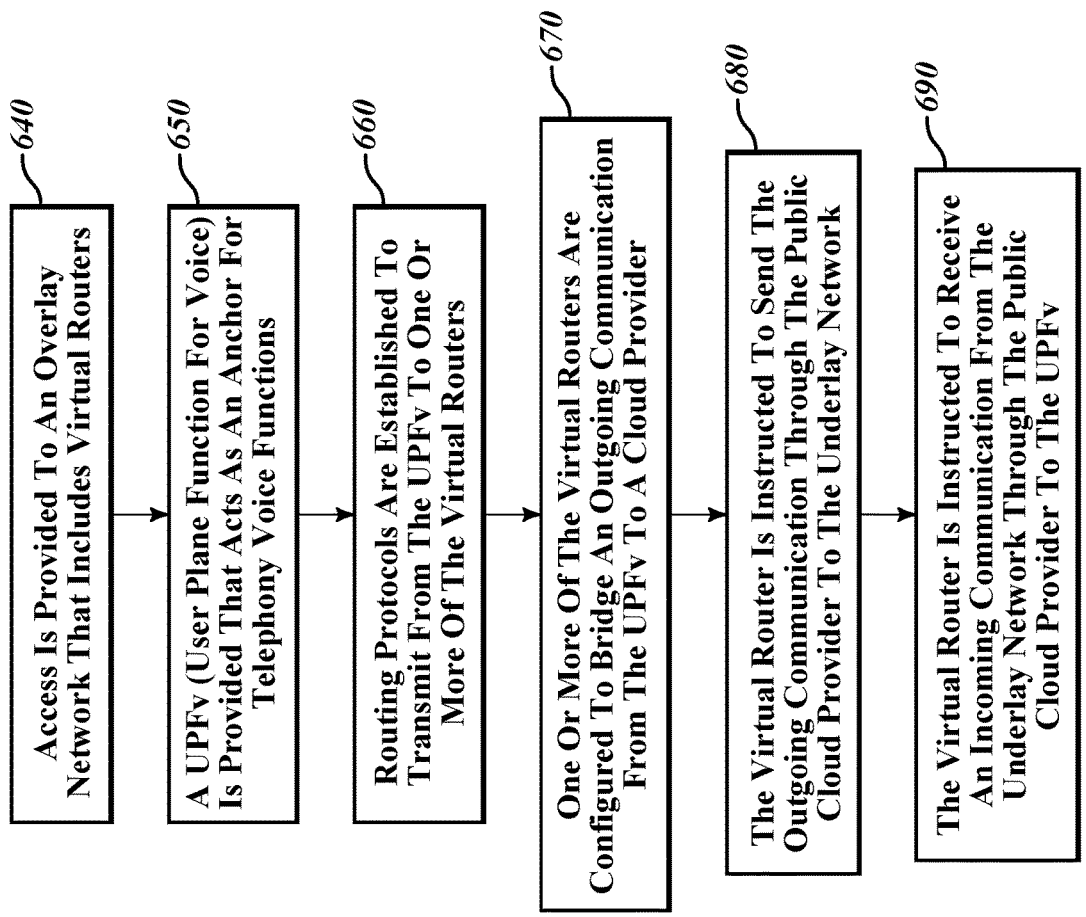

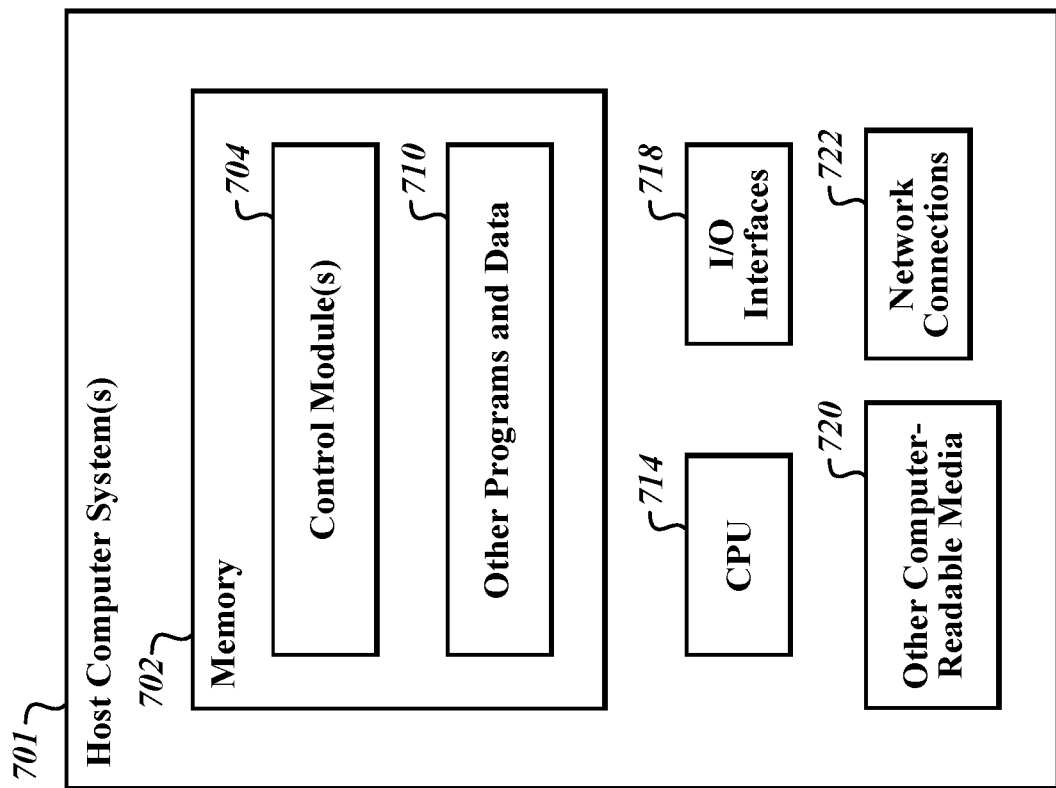

LEVERAGING A VIRTUAL ROUTER TO BRIDGE BETWEEN AN UNDERLAY AND AN OVERLAY

TECHNICAL FIELD

The present disclosure relates generally to telecommunication networks, more particularly, to managing the use of underlay and overlay networks.

BRIEF SUMMARY

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of Fifth Generation (5G) wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual RAN with interfaces creating additional data access points.

5G network functions may be completely software-based and designed as cloud-native, meaning that they're agnostic to the underlying cloud infrastructure, allowing higher deployment agility and flexibility.

With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in Telecommunications that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNB)) connected to the 5G core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021 December). Each network function (NF) is formed by a combination of small pieces of software code called as microservices.

Briefly stated, one or more methods for bridging data traffic between an underlay network and an overlay network are disclosed. Some such methods include: providing, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; providing access to an overlay network that includes virtual routers, wherein the overlay network is built above the underlay network, the underlay network including physical infrastructure that delivers packets; providing a UPFv (User Plane Function for Voice) that acts as an anchor for telephony voice functions; establishing routing protocols to transmit from the UPFv to one or more of the virtual routers; configuring one or more of the virtual routers to bridge an outgoing communication from the UPFv to a public cloud provider; instructing the virtual router to send the outgoing communication through the public cloud provider to the underlay network; and instructing the virtual router to receive an incoming communication from the underlay network through the public cloud provider to the UPFv.

In some embodiments, the UPFv uses OTA functions to communicate with the underlay network. In another aspect of some embodiments, the UPFv uses NRS (Narrowband Reference Signal) functions to communicate with the underlay network. In still another aspect of some embodiments, UPFv uses DNS (Domain Name System) functions to communicate with the underlay network.

In yet another aspect, some embodiments further include: updating a Virtual Private Cloud route table. In further aspects, some embodiments further include: updating a Virtual Router security group. In other aspects, some embodiments further include: accessing the NAT Gateway to access the internet. In still another aspect of some embodiments, the OTA IP pool advertises over a 5G Core.

In other embodiments, one or more systems for bridging data traffic between an underlay network and an overlay network are disclosed. Some such systems include: at least one memory that stores computer executable instructions; and at least one processor that executes the computer executable instructions to cause actions to be performed. Such actions include: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; provide access to an overlay network that includes virtual routers, wherein the overlay network is built above the underlay network, the underlay network including physical infrastructure that delivers packets; provide a UPFv (User Plane Function for Voice) that acts as an anchor for telephony voice functions; establish routing protocols to transmit from the UPFv to one or more of the virtual routers; configure one or more of the virtual routers to bridge an outgoing communication from the UPFv to a public cloud provider; and instruct the virtual router to send the outgoing communication through the public cloud provider to the underlay network; and instruct the virtual router to receive an incoming communication from the underlay network through the public cloud provider to the UPFv.

Additionally, in other embodiments, one or more non-transitory computer-readable storage mediums are disclosed. The one or more non-transitory computer-readable storage mediums have computer-executable instructions stored thereon that, when executed by at least one processor, cause the at least one processor to: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; provide access to an overlay network that includes virtual routers, wherein the overlay network is built above the underlay network, the underlay network including physical infrastructure that delivers packets; provide a UPFv (User Plane Function for Voice) that acts as an anchor for telephony voice functions; establish routing protocols to transmit from the UPFv to one or more of the virtual routers; configure one or more of the virtual routers to bridge an outgoing communication from the UPFv to a public cloud provider; and instruct the virtual router to send the outgoing communication through the public cloud provider to the underlay network.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 6B is a logic diagram showing the data flow between certain telecommunication network components during cellular telecommunication from a UPFv to the underlay network.

FIG. 7 shows a system diagram that describes an example implementation of a computing system(s) for implementing embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
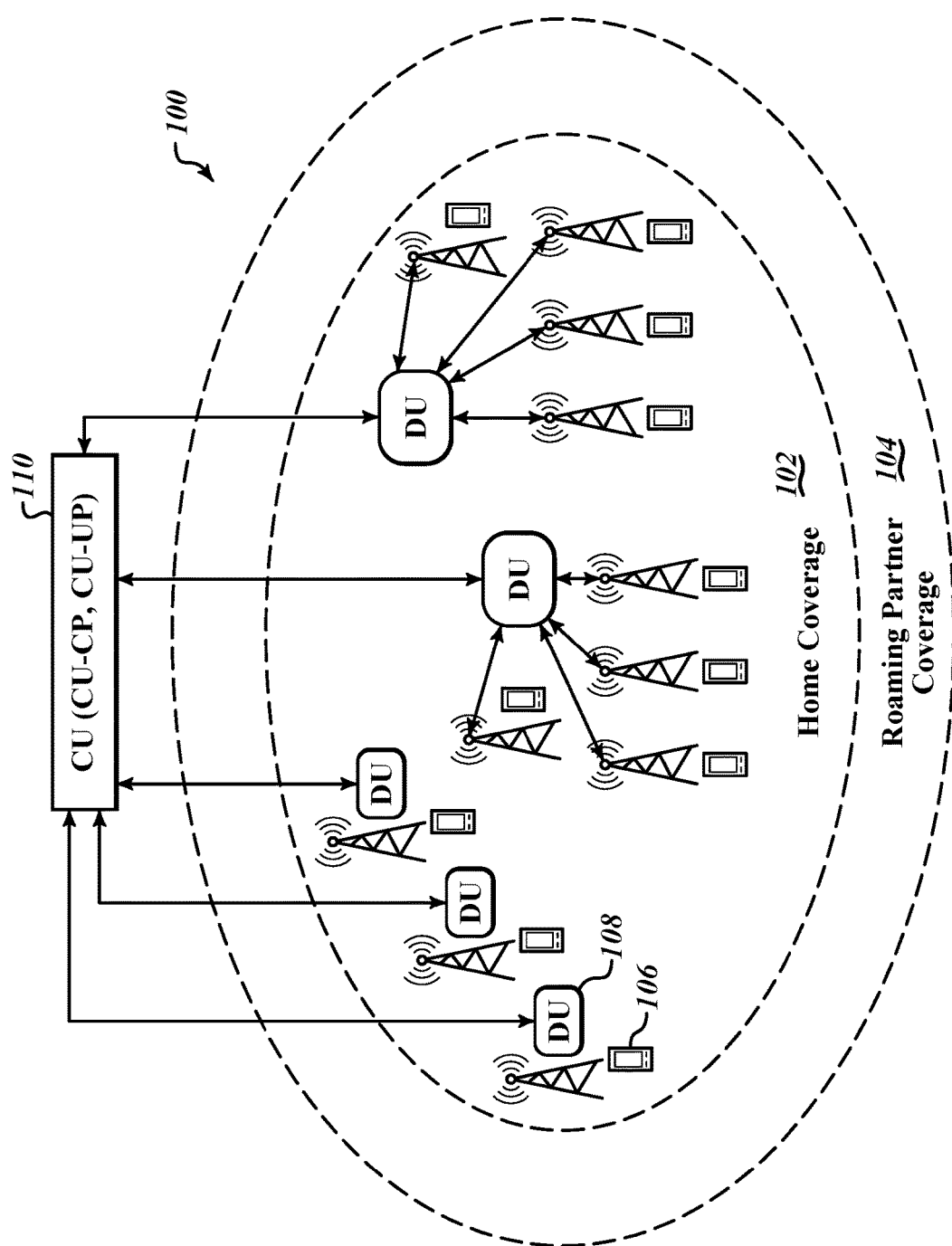
FIG. 1 illustrates a context diagram of an environment in which the bridging of data traffic between an underlay network and an overlay network may be implemented in accordance with embodiments described herein.

FIG. 1 illustrates a context diagram of an environment in which the bridging of data traffic between an underlay network and an overlay network may be implemented in accordance with embodiments described herein.

A given area 100 will mostly be covered by two or more mobile network operators' wireless networks. Generally, mobile network operators have some roaming agreements that allow users to roam from home network to partner network under certain conditions, shown in FIG. 1 as home coverage area 102 and roaming partner coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE will scan for a roaming network after a timer expiration (6 minutes, for example). This could have significant impact on customer experience in case of a catastrophic failure in the network. As shown in FIG. 1, a 5G RAN is split into DUs (e.g., DU 108) that manage scheduling of all the users and a CU that manages the mobility and radio resource control (RRC) state for all the UEs. The RRC is a layer within the 5G NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE.

Figure 2:
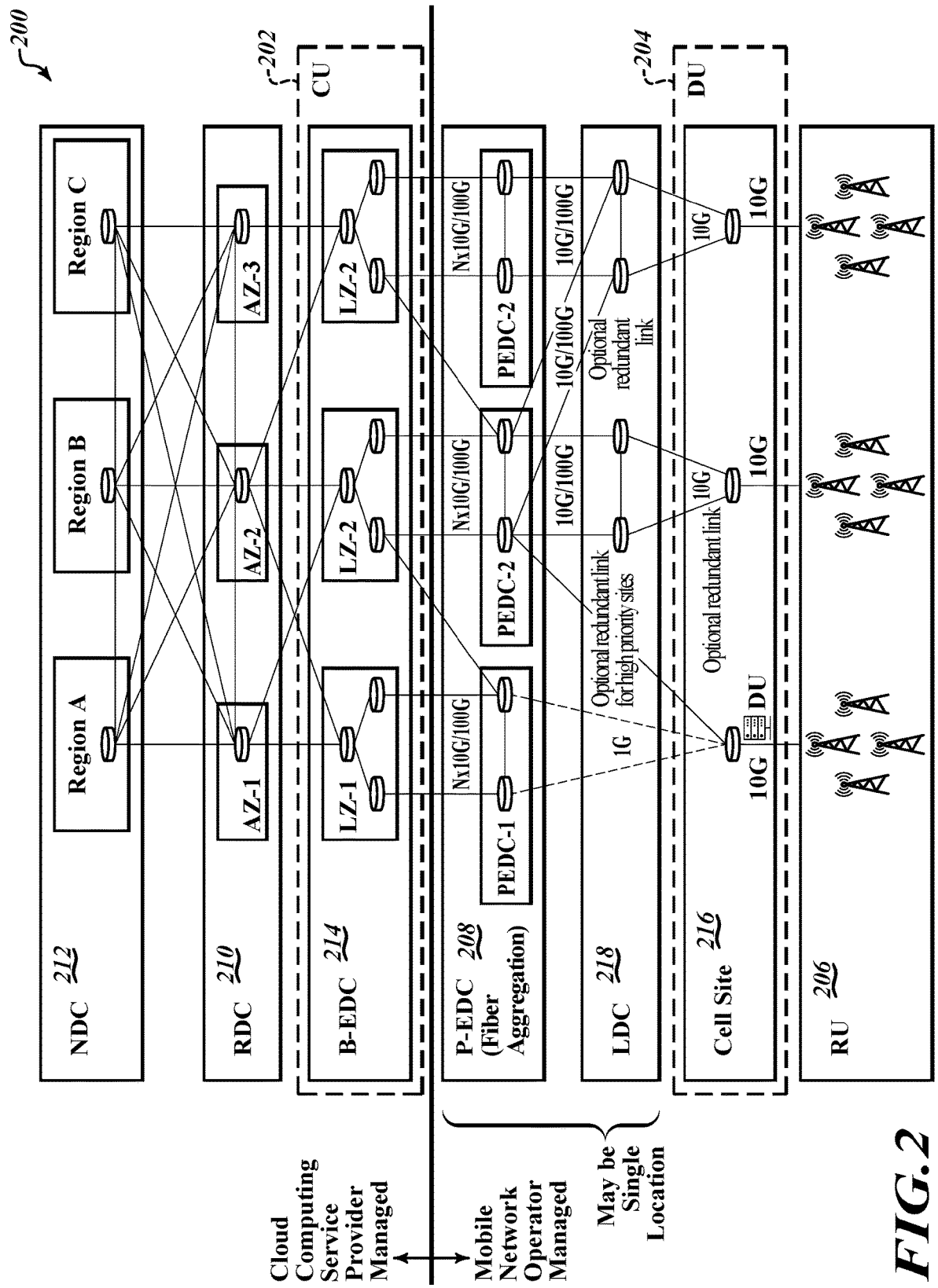
FIG. 2 illustrates a diagram of an example system architecture overview of a system in which the environment of FIG. 1 may be implemented in accordance with embodiments described herein.

FIG. 2 illustrates a diagram of an example system architecture overview of a system 200 in which the environment of FIG. 1 may be implemented in accordance with embodiments described herein.

As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB may comprise a CU and one DU connected to the CU via Fs-C and Fs-U interfaces for control plane (CP) and user plane (UP) respectively. A CU with multiple DUs will support multiple gNBs. The split architecture enables a 5G network to utilize different distribution of protocol stacks between CU 202 and DU 204 depending on mid-haul availability and network design. The CU 202 is a logical node that includes the gNB functions like transfer of user data, mobility control, RAN sharing, positioning, session management etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

Figure 3:
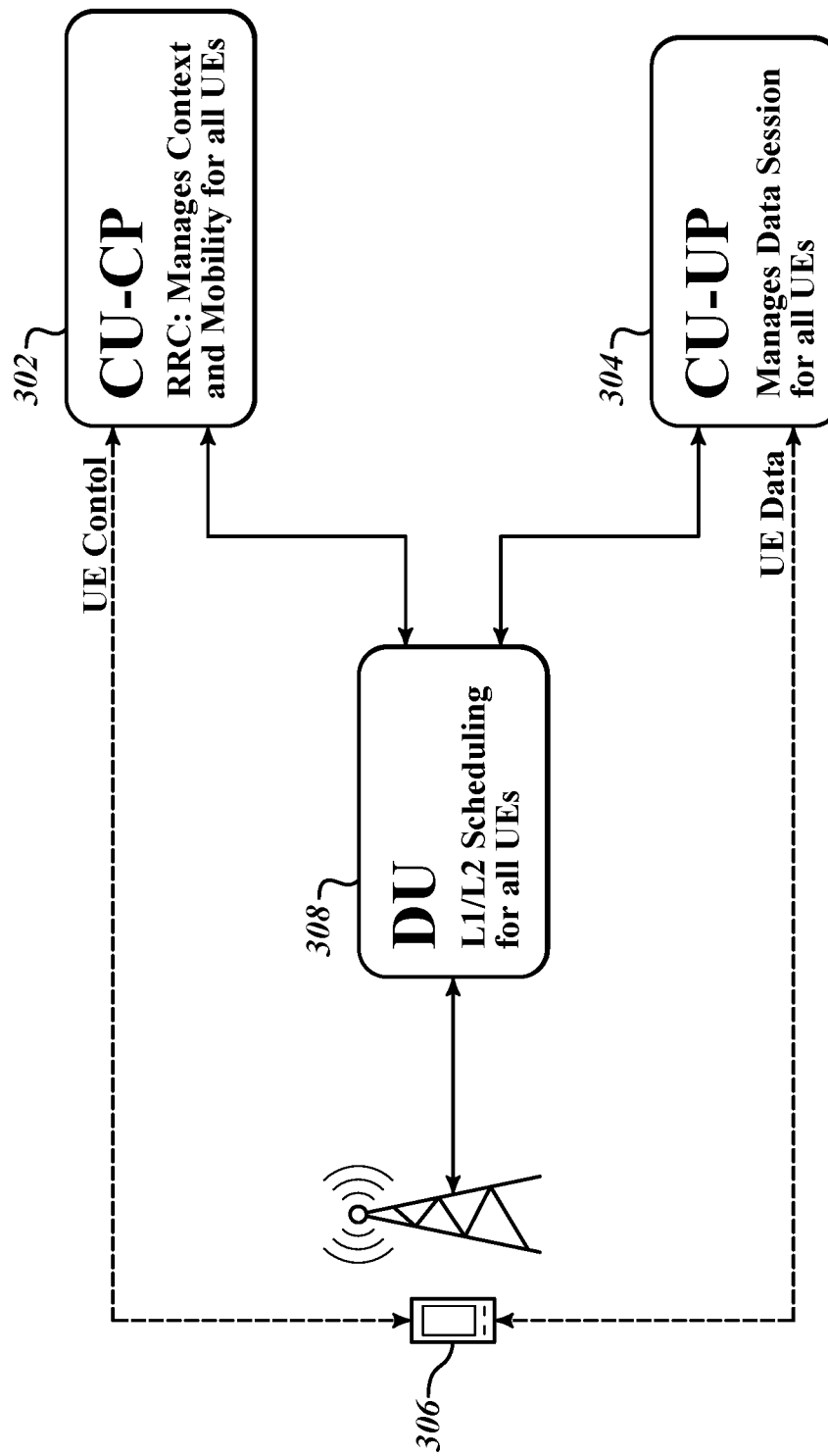
FIG. 3 illustrates a diagram showing connectivity between certain telecommunication network components during cellular telecommunication.

FIG. 3 is a diagram showing connectivity between certain telecommunication network components during cellular telecommunication in accordance with embodiments described herein.

The central unit control plane (CU-CP), for example of CU 110 of FIG. 1 or CU 202 of FIG. 2, primarily manages control processing of DUs, such as DU 308, and UEs, such as UE 302. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC.

In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

Figure 4:
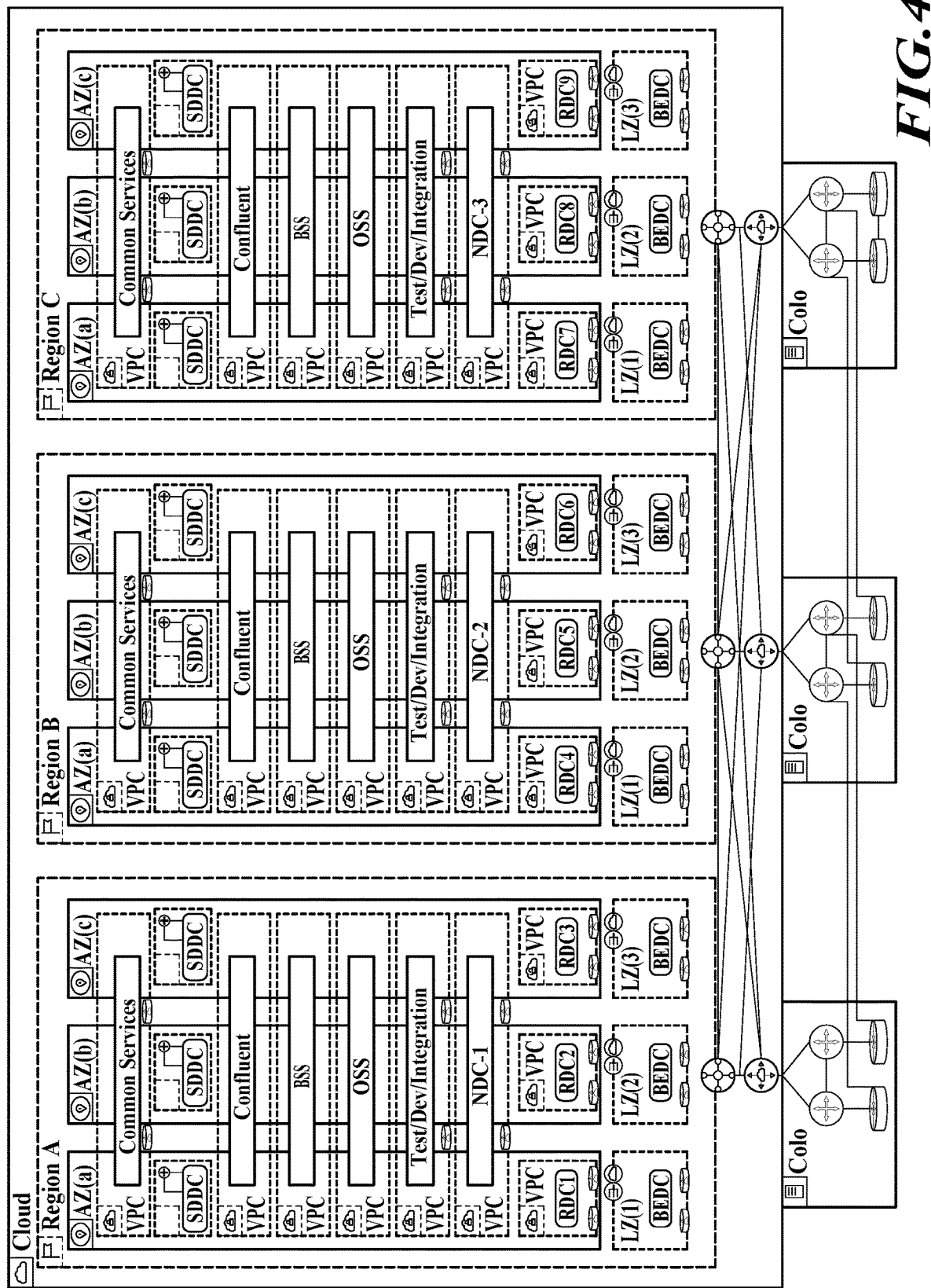
FIG. 4 illustrates a diagram of networking underlay with a Virtual Private Cloud design.

Referring now to FIG. 4, a Networking Underlay architecture is shown for a Virtual Private Cloud (VPC) design. An underlay network is the physical network responsible for the delivery of packets such as IP packets. A virtual private cloud is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channel) per user.

FIG. 4 displays one embodiment of VPCs used by the system that leverages a virtual router (v-router) to bridge between an underlay network and an overlay network. In some embodiments, this 5G network leverages the distributed nature of 5G cloud-native network functions and Cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), as shown in FIG. 4, to accommodate the distributed nature of 5G functions and the varying requirements for service layer integration. BEDCs are deployed in Local Zones hosting 5G NFs that have strict latency budgets. They are connected with Passthrough Edge Data Centers (PEDC), which serve as an aggregation point for all Local Data Centers (LDCs) and cell sites in a particular market. BEDCs also provide internet peering for 5G data service.

In the embodiment shown in FIG. 4, the NDCs host a nationwide global service such as OSS (Operating Support System) and BSS (Billing Support System). NDC is hosted in the Region and spans multiple AZs for high availability. For geographical diversity, in some embodiments, NDCs are mapped to Regions where three NDCs are built in three U.S. Regions (Region A, Region B, and Region C). An NDC is built to span across two AZs for high availability. Also shown in the network architecture displayed in FIG. 4 are DirectConnect Gateways, Transit Gateways, DirectConnect Routers, Internet Gateways, NAT Gateways, system routers, and virtual routers.

In one or more embodiment, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

In some embodiments, the User Plane Function (Data Network Name (DNN)) is collocated in the BEDC, which anchors user data sessions and routes to the internet. In another aspect, the BEDCs leverage local internet access available in Local Zones, which allows for a better user experience while optimizing network traffic utilization.

In one of more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, three RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilizes a high speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of the virtual router underlay/overlay bridge system, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider.

In still another aspect of some embodiments of the system architecture, the regional data center VPCs are confined into a single AZ per region. In yet another aspect, the breakout edge data center includes two of more VPCs. These two of more VPCs may include Direct Connect (DX) Virtual Private Clouds and Internet Virtual Private Clouds.

In one aspect of some embodiments, the system architecture includes one dedicated Virtual Private Cloud per region. Software-Defined Data Center software may be implemented to the Cloud Infrastructure, which enables customers to run production applications across private cloud environments.

In still another aspect of some embodiments of the system architecture, a transit gateway (TGW) is dedicated to each environment. A transit gateway is a network transit hub that may be used to interconnect virtual private clouds (VPCs) with on-premises networks. In yet another aspect of some embodiments, the transit gateway (TGW) enables peering between regions. Such Inter-Region VPC Peering enables VPC resources like EC2 instances (e.g., virtual servers in an Elastic Compute Cloud (EC2) for running applications), Relational Database Service (RDS) databases and Lambda functions (e.g., server-less compute services that run code in response to events and automatically manage underlying compute resources) running in different regions to communicate with each other using private IP addresses, without requiring gateways, VPN connections, or separate network appliances.

In some embodiments of the network architecture, each Region hosts one NDC and three RDCs. In such embodiments, the NDC functions communicate to each other through the Transit Gateway, where each VPC has an attachment to the specific regional Transit Gateway. EC2 and native networking is referred to herein as an Underlay Network in this network architecture. Provisioning of Transit Gateway and required attachments are automated using CI/CD pipelines with APIs. Transit Gateway routing tables are utilized to maintain isolation of traffic between functions.

Some embodiments of the 5G core network functions require support for advanced routing capabilities inside VPC and across VPCs (e.g., UPF, SMF and ePDG). These functions rely on routing protocols such as BGP for route exchange and fast failover (both stateful and stateless). To support these requirements, virtual routers are deployed on EC2 to provide connectivity within and across VPCs, as well as back to the on-prem network.

In some embodiments of the network architecture, each traffic from virtual routers is encapsulated using Generic Routing Encapsulation (GRE) tunnels, creating an Overlay Network. This leverages the Underlay network for end-point reachability. The Overlay network uses Intermediate Systems to Intermediate Systems (IS-IS) routing protocol in conjunction with Segment Routing Multi-Protocol Label Switching (SR-MPLS) to distribute routing information and establish network reachability between the virtual routers. Multi-Protocol Border Gateway Protocol (MP-BGP) over GRE is used to provide reachability from on-prem to Overlay network and reachability between different regions in the cloud. The combined solution provides the ability to honor requirements, such as traffic isolation and efficiently route traffic between on-prem, and 3rd parties (e.g., voice aggregators, regulatory entities, and the like).

Figure 5:
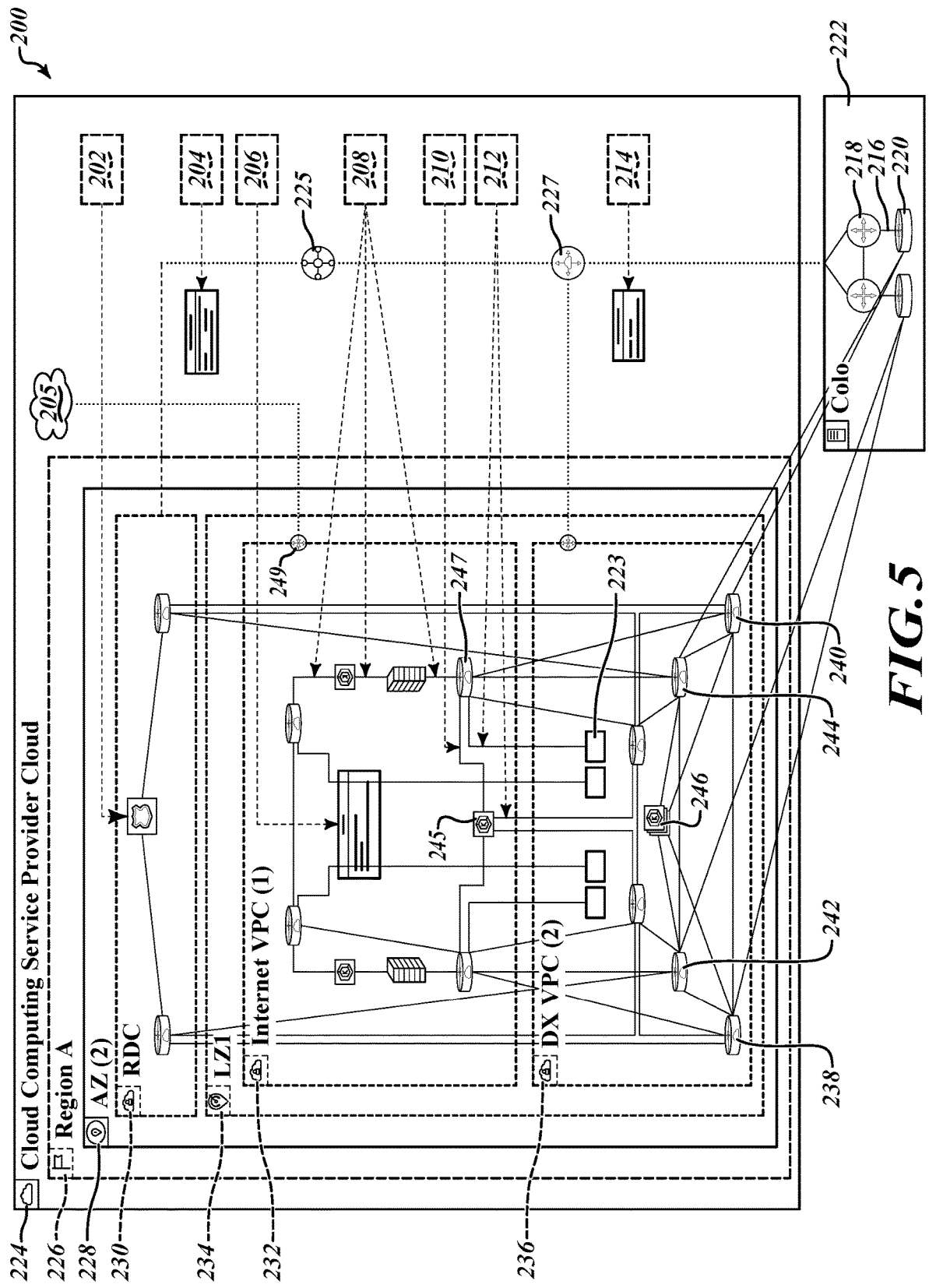
FIG. 5 illustrates a diagram of networking underlay with a Breakout Edge Data Center.

FIG. 5 is a diagram showing connectivity between certain telecommunication network components 200 involved in systems and methods for a P-EDC in a wireless telecommunication network in accordance with embodiments described herein.

Shown is a colocation data center (colo) 222 in which servers and other network equipment of different companies are physically co-located in the same physical facility. P-EDC routers 220, which are located in colo 222, receive and aggregate telecommunication data from a plurality of cellular telecommunication radio base stations and associated DUs, such as those of cell site 216 (FIG. 2) and DU 104 (FIG. 1), of an MNO, such as a 5G NR cellular telecommunication network of a telecommunication service provider.

One or more P-EDC routers 220 may transmit the telecommunication data to one or more physical routers (direct connect routers 218) of a breakout edge data center (B-EDC) of a cloud computing service provider cloud 224. In the present example embodiment, the transmission of such telecommunication data is made via connections including a fiber optic cable 216 directly connecting one of the P-EDC routers 220 to a corresponding one of the direct connect routers 218 the B-EDC.

The B-EDC hosts for the telecommunication service provider a 5G NR CU, disaggregated into CU-UP/CU-CP 246 corresponding to one or more of the DUs represented by DU 104 of FIG. 1. In the present example, one or more virtual routers (vRouters) of direct connect virtual private cloud (VPC) 236 provided by cloud computing service provider cloud 224 may be logically connected to and/or otherwise correspond to P-EDC routers 220. For example, vRouter 238, vRouter 240, vRouter 242 and vRouter 244 may be logically connected to corresponding ones of to P-EDC routers 220 as shown in FIG. 5.

The B-EDC is implemented within local zone 234 of cloud computing service provider cloud 224. A local zone of a cloud computing service provider is a type of infrastructure deployment that places compute, storage, database, and other select cloud computing service provider services close to large population and industry centers. In the present example, the local zone 234 may selected based on its geographic proximity to particular cellular sites (e.g. a cellular site serving base stations) and/or a group of MNO cellular telephone users or cellular telephone or Internet of Things (IoT) devices (referred to as user equipment devices (UEs)).

In an example embodiment, the telecommunication network components 200 route, at the local zone 234, using the VPC 236, at least some of the telecommunication data via Generic Routing Encapsulation (GRE) tunneling via GRE subnet 223 to an Internet VPC 232 that provides connectivity to the Internet 205 and is hosted by the B-EDC at the local zone 234. The telecommunication network components 200 also route, at the local zone 234, using the direct connect VPC 236, at least some of the telecommunication data via GRE tunneling to a regional data center (RDC) 230 of the cloud computing service provider cloud 224. The RDC 230 may be separated geographically from the B-EDC.

In an example embodiment, local gateway (LGW) route table 214 is implemented for routing to transit gateway (TGW) 225 (to reach RDC 230) via a direct connect gateway (DXG) 227. Connections 212 may be AWS Elastic Network Interface (ENI) xENI connections (e.g., in VMware® Cloud on Amazon Web Services (AWS) Compute virtual machines (VM)) from direct connect VPC 236 for GRE tunneling, 5G N2 interface functionality (which connects the gNodeB to the Access and Mobility Management Function, or AMF), 5G N3 interface functionality (which connects the gNodeB (RAN) to the 5G User Plane Function (UPF) 245), operations, administration and maintenance (OAM), signaling, etc. The UPF 245 advertises the Internet Protocol (IP) pool to virtual routers (e.g., vRouter 247) over the 5G N6 interface (public IP address) via connection 210. Also shown are static routes 208 and ENI based routing 206 to route traffic to the 5G N6 interface on virtual routers (vRouters). Ingress routing 204 is enabled to route the assigned IP Public /23 to the LGW 249. The domain name service (DNS) resolver 202 may be provisioned in the RDC 230 and is attached to an 5G N6 interface, but may be replaced with an on-premises, cloud-native core networking security service platform (e.g., such as that from Infoblox®) in the B-EDC.

In some embodiments, a Networking Underlay architecture is shown in FIG. 5 for a Breakout Edge Data Center (BEDC) design. Local Data Centers (LDCs) and individual cell sites will send end users' traffic into Passthrough Edge Data Centers (PEDC), which will then connect to Breakout Edge Data Centers (BEDCs) that sit in a suitable Local Zone. BEDCs run a Centralized Unit (CU) and User Plane Function. In one or more embodiments, this type of edge capability also enables enterprise customers and end-users (gamers, streaming media, and other applications) to leverage of 5G speeds with minimal latency.

In one aspect of some embodiments of the system architecture, each BEDC includes two or more Virtual Private Clouds (VPCs). These two of more VPCs may include Direct Connect (DX) Virtual Private Clouds and Internet Virtual Private Clouds. Referring now to the Direct Connect Virtual Private Cloud, the DX VPC connects to the Direct Connect and the region. Additionally, the Direct Connect Virtual Private Cloud includes a 5G Radio Access Network (RAN) and a User Plane Function (UPF), except for an N6 interface. A 5G RAN uses 5G radio FDD frequencies to provide wireless connectivity to devices to deliver application. Further, the Direct Connect Virtual Private Cloud includes one or more Virtual Routers. A Virtual Router is a software function that replicates in software the functionality of a hardware-based Layer 3 Internet Protocol (IP) routing, which has traditionally used a dedicated hardware device.

Referring now to the Internet Virtual Private Cloud, the Internet VPC provides Internet Egress for a User Plane Function (UPF). Additionally, the Internet VPC includes firewalls, e.g., Palo Alto Network Firewalls. Further, the Internet VPC includes distributed denial of service (DDoS) protection safeguards, such as those provided by Allot Network Security. Moreover, the Internet Virtual Private Cloud includes one or more Virtual Routers.

In some embodiments, the underlay network needs to communicate with the overlay network, and the overlay network needs to communicate with the underlay network. In some embodiments, the virtual router underlay/overlay bridge system forces data traffic from the underlay network to the overlay network, forces data traffic from the overlay network to the underlay network, or both. Such systems leverage one or more virtual routers to bridge between the overlay network on one plane and the underlay network on another plane. The virtual router underlay/overlay bridge system may be used for NRS, DNS, and/or interconnects with OTA (Over the Air).

In some embodiments of telco-grade networks, resiliency drives the design configuration. Redundancy and resiliency are addressed at various layers of the 5G stack. Transport availability in failure scenarios is also discussed herein. High availability and geo-redundancy are NF dependent, while some NFs are required to maintain state.

In another aspect of some embodiments of NDCs, high availability and geo-redundancy are required. High availability is achieved by deploying two redundant NFs in two separate availability zones 228 within a single VPC. The two separate availability zones 228 are implemented within Region A 226 of cloud computing service provider cloud 224. Failover within an AZ 228 can be recovered within the region without the need to route traffic to other regions. The in-region networking uses the underlay and overlay constructs, which enable on-prem traffic to seamlessly flow to the standby NF in the secondary AZ 228 if the active NF becomes unavailable.

Geo-Redundancy is achieved by deploying two redundant NFs in two separate availability zones in more than one region. This is achieved by interconnecting all VPCs via inter-region Transit Gateway and leveraging v-router for overlay networking. The overlay network is built as a full-mesh enabling service continuity using the NFs deployed across NDCs in other regions (e.g., Markets, B-EDCs, RDCs, in Region A can continue to function using the NDC in Region B).

In some embodiments of RDCs, high availability and geo-redundancy are achieved by NFs failover between VPCs (multiple Availability zones) within one region. These RDCs are interconnected via Transit Gateway with the v-router based overlay network. This provides on-premise and B-EDC reachability to the NFs deployed in each RDC with route policies in place to ensure traffic only flows to the backup RDCs, if the primary RDC becomes unreachable.

Figure 6A:
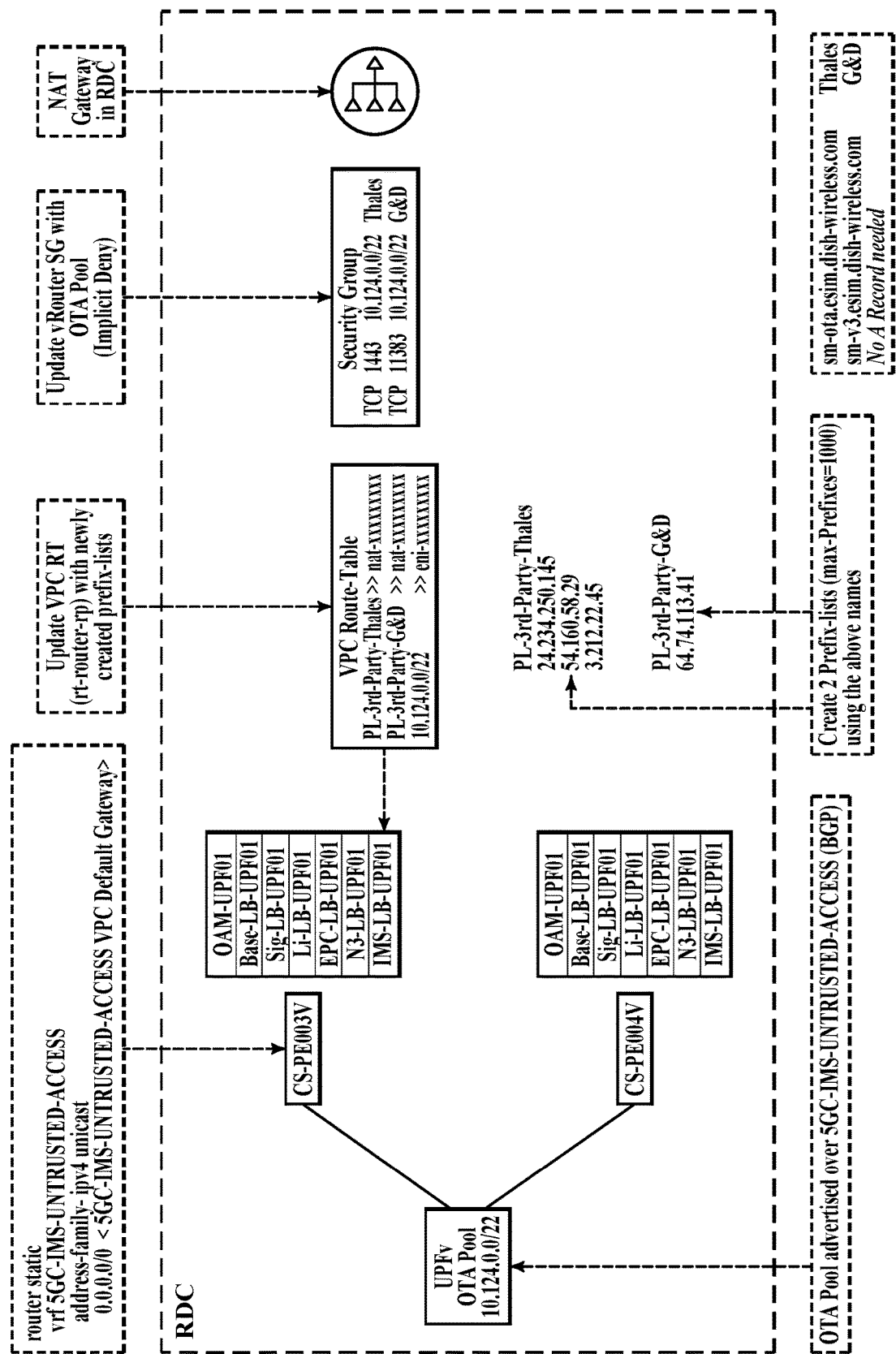
FIG. 6A illustrates a diagram of UPF for telephony voice functions interconnected to a virtual router, a Virtual Private Cloud route table, and a security group.

Referring now to FIG. 6A, a virtual router underlay/overlay bridge system architecture is shown. In some embodiments of this 5G system architecture, a UPFv (User Plane Function for Voice) in the anchor point for telephony voice functions. In one or more aspects of some embodiments, the UPFv needs to communicate with the outside world (e.g., its telecommunication service provider) for data traffic such as push notifications, downloading of patches, and the like. However, the outside world is connected to the underlay network (i.e., the physical network responsible for the delivery of packets), not the overlay network (i.e., a virtual network that is built on top of an underlying network infrastructure).

Additionally, the UPFv has specific router requirements so it cannot directly connect to traditional physical routers on the underlay network. Instead, the UPFv only communicates with the Virtual Routers (i.e., the Overlay routers) where it establishes a routing protocol. Virtual Routers are typically only used as router functions on the virtual overlay network.

In some embodiments of the virtual router underlay/overlay bridge system and method, the virtual router is instructed to send transmission from the UPFv to an updated VPC route table on a cloud computing service provider to get to the physical underlay network. In this regard, the reconfigured virtual router acts as the bridge to the physical underlay network for the data traffic. Next, the data traffic travels to the virtual router Security Group from the updated VPC route table. Continuing, the data traffic then travels to a NAT Gateway in the Regional Data Center, and then finally to the Internet and the physical underlay network. In this regard, in some embodiments, the UPFv uses OTA (Over the Air) functions to access the physical underlay network and the outside world. In a corresponding manner, the only way for data traffic to get to the UPFv from the physical underlay network, is through the Virtual Router on a reversed path. In this regard, the UPFv may be associated with an IP address (e.g., 10.124.0.0) that is used VPC route table on a cloud computing service provider to receive data traffic that is trying to reach the UPFv from the physical underlay network.

FIG. 6B is a logic diagram showing the data flow between certain telecommunication network components during cellular telecommunication from a UPFv to the underlay network.

As shown in FIG. 6B, at operation 640, access is provided to an overlay network that includes virtual routers. The overlay network is built above an underlay network. It is the underlay network that includes physical infrastructure that delivers packets. It is also the underlay network that accesses the outside world, such as the Internet. At operation 650, a UPFv (User Plane Function for Voice) is provided that acts as an anchor for telephony voice functions. At operation 660, routing protocols are established to transmit from the UPFv to one or more of the virtual routers. At operation 670, one or more of the virtual routers are configured to bridge an outgoing communication from the UPFv to a public cloud provider. At operation 680, the virtual router is instructed to send the outgoing communication through the public cloud provider to the underlay network. Additionally, in some embodiments, at operation 690, the virtual router is instructed to receive an incoming communication from the underlay network through the public cloud provider to the UPFv.

FIG. 7 shows a system diagram that describes an example implementation of a computing system(s) for implementing embodiments described herein. The functionality described herein for bridging data traffic between an underlay network and an overlay network, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility.

In particular, shown is example host computer system(s) 701. For example, such computer system(s) 701 may represent those in various data centers and cell sites shown and/or described herein that host the functions, components, microservices and other aspects described herein to implement the bridging of data traffic between an underlay network and an overlay network. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for bridging data traffic between an underlay network and an overlay network. Memory 702 may also store other programs and data 710, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for bridging data traffic between an underlay network and an overlay network, the method comprising:
providing, by a mobile network operator, a distributed unit (DU) of a fifth-generation (5G) cellular telecommunication network radio access network (RAN) that is served by a particular 5G cellular site base station, wherein the DU:
is associated with a primary 5G Node B (gNB) identified by a primary identifier (ID); and
is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;
providing access to an overlay network that includes virtual routers, wherein the overlay network is built above the underlay network, the underlay network including physical infrastructure that delivers packets;
providing a UPFv (User Plane Function for Voice) that acts as an anchor for telephony voice functions;
establishing routing protocols to transmit from the UPFv to one or more of the virtual routers;
configuring one or more of the virtual routers to bridge an outgoing communication from the UPFv to a public cloud provider;
instructing the virtual router to send the outgoing communication through the public cloud provider to the underlay network; and
instructing the virtual router to receive an incoming communication from the underlay network through the public cloud provider to the UPFv.

2. The method of claim 1 further comprising: updating a Virtual Private Cloud route table.

3. The method of claim 1, further comprising: updating a Virtual Router security group.

4. The method of claim 1, further comprising: accessing a Network Address Translation (NAT) Gateway to access the Internet.

5. The method of claim 1, wherein the UPFv uses Over the Air (OTA) functions to communicate with the underlay network.

6. The method of claim 1, wherein the UPFv uses NRS functions to communicate with the underlay network.

7. The method of claim 1, wherein the UPFv uses DNS functions to communicate with the underlay network.

8. The method of claim 1, wherein an OTA IP pool advertises over a 5G Core.

9. A system for bridging data traffic between an underlay network and an overlay network, the system comprising:
at least one memory that stores computer executable instructions; and
at least one processor that executes the computer executable instructions to cause actions to be performed, the actions including:
provide, by a mobile network operator, a distributed unit (DU) of a fifth-generation (5G) cellular telecommunication network radio access network (RAN) that is served by a particular 5G cellular site base station, wherein the DU:
is associated with a primary 5G Node B (gNB) identified by a primary identifier (ID); and
is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;

provide access to an overlay network that includes virtual routers, wherein the overlay network is built above the underlay network, the underlay network including physical infrastructure that delivers packets;

provide a UPFv (User Plane Function for Voice) that acts as an anchor for telephony voice functions;

establish routing protocols to transmit from the UPFv to one or more of the virtual routers;

configure one or more of the virtual routers to bridge an outgoing communication from the UPFv to a public cloud provider;

instruct the virtual router to send the outgoing communication through the public cloud provider to the underlay network; and instruct the virtual router to receive an incoming communication from the underlay network through the public cloud provider to the UPFv.

10. The system of claim 9 further comprising: updating a Virtual Private Cloud route table.

11. The system of claim 9, further comprising: updating a Virtual Router security group.

12. The system of claim 9, further comprising: accessing a Network Address Translation (NAT) Gateway to access the Internet.

13. The system of claim 9, wherein the UPFv uses OTA functions to communicate with the underlay network.

14. The system of claim 9, wherein the UPFv uses NRS functions to communicate with the underlay network.

15. The system of claim 9, wherein the UPFv uses DNS functions to communicate with the underlay network.

16. The system of claim 9, wherein an OTA pool advertises over a 5G Core.

17. A non-transitory computer-readable storage medium having computer-executable instructions stored thereon that, when executed by at least one processor, cause the at least one processor to cause actions to be performed, the actions including:

provide, by a mobile network operator, a distributed unit (DU) of a fifth-generation (5G) cellular telecommunication network radio access network (RAN) that is served by a particular 5G cellular site base station, wherein the DU:

is associated with a primary 5G Node B (gNB) identified by a primary identifier (ID); and is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;

provide access to an overlay network that includes virtual routers, wherein the overlay network is built above an underlay network, the underlay network including physical infrastructure that delivers packets;

provide a UPFv (User Plane Function for Voice) that acts as an anchor for telephony voice functions;

establish routing protocols to transmit from the UPFv to one or more of the virtual routers;

configure one or more of the virtual routers to bridge an outgoing communication from the UPFv to a public cloud provider; and instruct the virtual router to send the outgoing communication through the public cloud provider to the underlay network.

18. The non-transitory computer-readable storage medium of claim 17, the actions further including:

instruct the virtual router to receive an incoming communication from the underlay network through the public cloud provider to the UPFv.

\* \* \* \* \*